United States Patent
Vossel et al.

(10) Patent No.: US 6,651,965 B1
(45) Date of Patent: Nov. 25, 2003

(54) RUBBER BEARING HAVING AXIAL DAMPING

(75) Inventors: Andreas Vossel, Osnabrück (DE); Frank Meyerink, Lohne (DE)

(73) Assignee: ZF Lemförder Metallwaren AG, Lemförde (DE)

( * ) Notice: Subject to any disclaimer, the term of this patent is extended or adjusted under 35 U.S.C. 154(b) by 0 days.

(21) Appl. No.: 09/806,802

(22) PCT Filed: Aug. 2, 2000

(86) PCT No.: PCT/DE00/02556
§ 371 (c)(1),
(2), (4) Date: Apr. 3, 2001

(87) PCT Pub. No.: WO01/11256
PCT Pub. Date: Feb. 15, 2001

(30) Foreign Application Priority Data

Aug. 4, 1999 (DE) .......................................... 199 36 014

(51) Int. Cl.[7] .............................................. F16F 13/00
(52) U.S. Cl. ............................ 267/140.12; 267/141.2
(58) Field of Search ...................... 267/140.11, 140.12, 267/141, 141.1, 141.2, 141.3, 141.4, 141.5, 294

(56) References Cited

U.S. PATENT DOCUMENTS

| | | | | |
|---|---|---|---|---|
| 4,739,979 A | * | 4/1988 | Kanda ..................... | 267/140.1 |
| 5,413,319 A | | 5/1995 | Hein et al. ............. | 267/140.12 |
| 5,595,373 A | * | 1/1997 | Ikeda .................... | 267/140.12 |
| 5,690,320 A | * | 11/1997 | Kanda ................... | 267/140.12 |

FOREIGN PATENT DOCUMENTS

| | | |
|---|---|---|
| DE | 6362612 | 4/1987 |
| DE | 4143080 | 7/1992 |
| DE | 19713003 | 10/1998 |
| EP | 0867313 | 9/1998 |
| FR | 2659177 | 9/1991 |
| JP | 11063085 | 3/1999 |

* cited by examiner

*Primary Examiner*—Matthew C. Graham
*Assistant Examiner*—Thomas J. Williams
(74) *Attorney, Agent, or Firm*—McGlew and Tuttle, P.C

(57) ABSTRACT

A rubber bearing with axial damping includes a multipart bearing inner part (1), an elastomer (9, 9'), which surrounds the bearing inner part (1) in some sections and is connected thereto by vulcanization, chambers (5, 5') for accommodating a damping agent, a channel carrier (11) with at least one damping agent channel (12), which makes possible the circulation of the damping agent between the chambers (5, 6, 7), as well as an essentially cylindrical bearing sleeve (10), which accommodates the above-mentioned bearing parts. The bearing inner part (1) has a section (2, 3) of increased diameter compared with a middle area (4) of the bearing inner part (1) at the respective axial ends of the bearing. A channel carrier (11) with chambers 5, 5' for the damping agent is arranged between the sections (2, 3) of increased diameter of the bearing inner part (1). The channel carrier (11) comprises an inner sleeve (13), an elastomer (14) connected to the inner sleeve by vulcanization and a channel ring (15), which surrounds the inner sleeve (13) and the elastomer and is likewise connected to them by vulcanization. At least one groove, which forms at least one channel (12) between the channel ring (15) and the bearing sleeve 10, is milled into the outer contour of the channel ring (15). The chambers (5, 5') are formed in the channel carrier (11) and the chambers (6, 7) are formed during the mounting of the bearing between the channel part (11) and the sections (2, 3) of increased diameter of the bearing inner part (1) in the vicinity of the axial ends of the bearing are connected to one another via the channel (12).

17 Claims, 3 Drawing Sheets

RUBBER BEARING HAVING AXIAL DAMPING

FIELD OF THE INVENTION

The present invention pertains to a rubber bearing with axial damping, which comprises essentially an inner part, an elastomer, which surrounds the inner part in some sections and is connected to same by vulcanization, chambers for a damping agent, a channel carrier with a damping agent channel, and a bearing sleeve accommodating the above-mentioned parts.

BACKGROUND OF THE INVENTION

A very great variety of designs of rubber bearings are manufactured and frequently used especially in the automobile industry. They are used, e.g., to mount the wheel suspension or as subframe mounts there. Depending on the intended purpose, different requirements are imposed on the damping behavior of the rubber bearings. The damping behavior can be affected both by selecting the materials, especially the elastomer, and by the design embodiment of the bearing.

It has been known that rubber bearings may be designed such that they have chambers for accommodating a damping agent, preferably a hydraulic damping agent. The quenching effect brought about by the mass damping is utilized to achieve a high damping effect. Damping agent channels, which connect the chambers containing damping agent, are provided for this purpose in the bearing, so that the damping agent can circulate between the chambers and cause the quenching effect due to its mass swinging to and fro.

Such a bearing with chambers for the damping agent and with a specially designed damping agent channel is described, e.g., in DE 197 29 290. A channel carrier, in which the damping agent channel connecting the chambers arranged in a radially distributed pattern to one another, is provided in this bearing between the inner part of the bearing and the outer sleeve. The damping behavior of the bearing can be affected by the amount and the type of the damping agent and, of course, by the size of the damping agent chamber. However, the bearing disclosed in this document is designed mainly to affect the damping behavior in the case of forces introduced radially.

However, the axial damping behavior of the bearing plays an important role especially in subframe mounts. It is therefore desirable to design a rubber bearing such that the quenching effect can also be utilized with respect to an axial damping and the damping behavior can be varied.

SUMMARY AND OBJECTS OF THE INVENTION

The object of the present invention is to provide a rubber bearing which can be designed in a variable manner in terms of its axial damping behavior while having a simple design.

According to the invention, a rubber bearing with axial damping is provided comprising a multipart bearing inner part, an elastomer, which surrounds the bearing inner part in some sections and is connected thereto by vulcanization. The bearing has chambers for accommodating a damping agent, a channel carrier with at least one damping agent channel, which makes possible the circulation of the damping agent between the chambers, as well as an essentially cylindrical bearing sleeve, which accommodates the above-mentioned bearing parts. The bearing inner part has a section with increased diameter compared with a middle area of the bearing inner part at the axial ends of the bearing. The channel carrier has chambers for the damping agent and includes an inner sleeve, an elastomer connected to the inner sleeve by vulcanization, and a channel ring, which surrounds the inner sleeve and the elastomer and is likewise connected to same by vulcanization. The channel ring is arranged between the sections of increased diameter of the bearing inner part. At least one groove is milled into the outer contour of the channel ring. The groove forms at least one channel between the channel ring and the bearing sleeve. The chambers formed in the channel carrier as well as the chambers being formed during the mounting of the bearing between the channel part and the sections of increased diameter of the bearing inner part in the vicinity of the axial bearing ends are connected to one another via the channel.

The rubber bearing comprises, in the known manner, a bearing inner part and an elastomer, which surrounds the bearing inner part in some sections and is connected thereto by vulcanization, and it has chambers for receiving a damping agent as well as a damping agent channel which makes possible the circulation of the damping agent between the chambers. The parts of the bearing are accommodated by an essentially cylindrical bearing sleeve. The bearing inner part is made in one piece, as in the other bearings known from the prior art as well. In addition, the bearing inner part has a section each with increased diameter compared with the middle area of the bearing inner part at the axial bearing ends.

A channel carrier with chambers for the damping agent is arranged according to the present invention between the sections of increased diameter of the bearing inner part. This channel carrier comprises an inner sleeve, an elastomer connected to the inner sleeve by vulcanization, and a channel ring, which surrounds the inner sleeve and the elastomer and is likewise connected to them by vulcanization. At least one groove is milled into the outer contour of the channel ring, and the groove forms at least one channel, via which the chambers formed in the channel carrier as well as the chambers being formed during the mounting between the channel carrier and the sections of increased diameter of the bearing inner part are connected to one another.

According to one possible design, the multipart bearing inner part comprises two carrier bodies, one of which forms the entire middle area of the bearing inner part and a section of one axial bearing end, which section joins the middle area and has an increased diameter compared with the middle area. The other carrier body is designed as a ring, which forms the other axial bearing end of the bearing inner part, which end has an expanded diameter. The last carrier body is pushed according to the present invention over the first carrier body forming the middle area of the bearing inner part. Both carrier bodies are surrounded in the area of the axial bearing ends by an elastomer which is connected to them and to an outer ring each by vulcanization.

A shoulder is advantageously provided for the axial fixation of the channel carrier in the rubber bearing thus designed at the carrier body on the part forming the middle area of the bearing inner part in the vicinity of the section of increased diameter.

To mount the bearing in the correct position, the part of the carrier body forming the middle area of the bearing inner part is also provided with a flattened area on its circumferential surface.

The channel for the damping agent extends according to the present invention obliquely or helically on the outer contour of the channel ring. The damping agent channel connects to one another the chambers which are formed during the mounting between the channel carrier and the sections of increased diameter of the bearing inner part. These chambers are formed, axially opposite one another, in the vicinity of the axial bearing ends due to the shape of the bearing inner part and the channel carrier. Damping that acts both radially and axially and can be easily varied by a corresponding shape of the bearing parts is obtained if there is a connection that makes possible the circulation of the damping agent between the chamber or chambers formed in the vicinity of an axial bearing end and the chambers in the channel carrier.

The modular design of the bearing makes it possible in a particularly favorable manner to coordinate the damping behavior of the bearing with the particular intended use. Moreover, by selecting various shapes of the channel carrier provided according to the present invention, it is also possible in a simple manner to obtain a different characteristic. Thus, the outer contour and the inner contour of the channel carrier as well as the elastomer surrounding the inner sleeve and consequently the outer contour of the channel carrier may have a cross section deviating from the circular shape, while its inner contour has an approximately circular cross section. It is thus possible to vary the characteristics of the bearing without changing the shape of the bearing inner part, especially without deviating from the cylindrical shape in the case of the bearing inner part. For example, it is possible without increased manufacturing effort to obtain different characteristics of the bearing in the circumferential direction by means of a square or rectangular shape of the channel carrier cross section. The multipart bearing inner part composed of the carrier bodies may also comprise relatively thin hollow section elements.

On the whole, the present invention provides a bearing design that is characterized by high flexibility in terms of the adaptation of the essential characteristics of the bearing to the particular intended use. This is achieved above all by the modular design of the bearing, but especially by means of the channel carrier, which makes possible a high degree of variability in terms of the radial damping behavior of the bearing due to the shape of its outer contour, on the one hand, and, on the other hand, permits a fine adjustment of the axial damping behavior due to the length of the damping agent channel being variable within broad limits. In addition, the advantages described are obtained with a comparatively simple bearing design.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
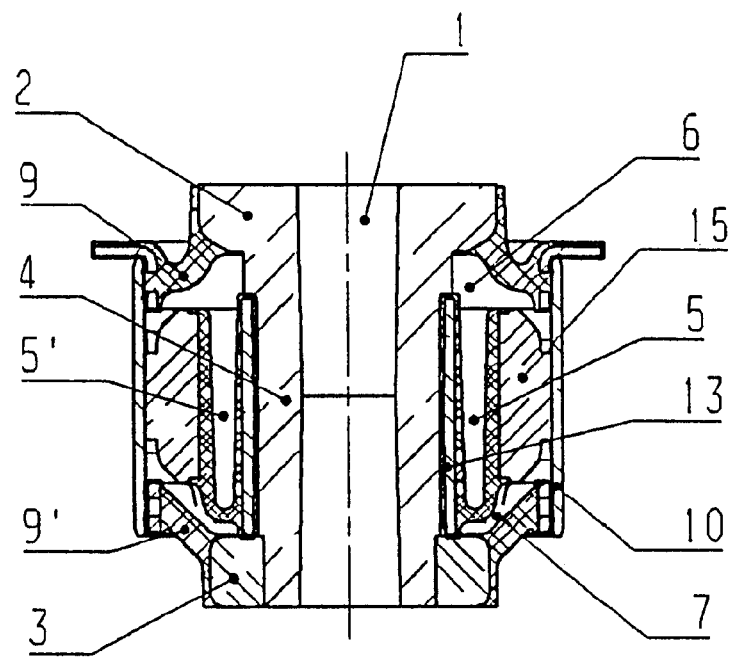
FIG. 1 is an axially cut-away sectional view showing the bearing according to the present invention.
Figure 2:
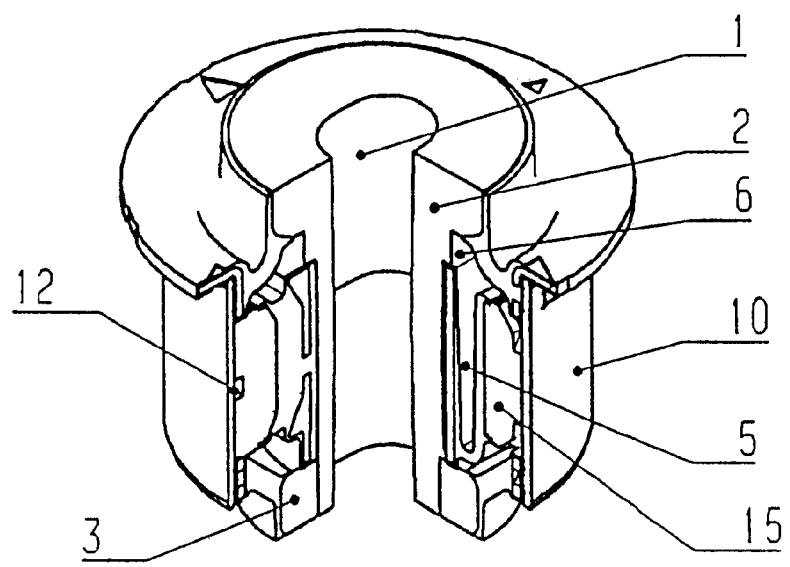
FIG. 2 is an axonometric partially cut-away view showing the bearing according to FIG. 1.

Referring to the drawings in particular, FIG. 1 shows the design of the bearing according to the present invention on the basis of a sectional view, in which the section extends axially through the bearing. The bearing is formed essentially by a bearing inner part 1, a channel carrier 11 surrounding the bearing inner part 1 as well as a bearing sleeve 10 accommodating these parts. The bearing inner part 1 has a multipart design and comprises, in the example being shown, two carrier bodies 16, 17, one of which forms the entire middle area 4 of the bearing inner part 1 and a rigid section 2 of increased diameter opposite the middle area 4 at the axial end of the bearing, while the other carrier body 17 comprises an annular element, which is pushed over the first carrier body 16. The channel carrier 11, which surrounds the bearing inner part 1, comprises an inner sleeve 13 and a channel ring 15. Chambers 5, 5' for accommodating a damping agent are provided within channel ring 15, between the inner sleeve 13 and the channel ring 15. Additional chambers 6, 7 are formed between the rigid sections 2, 3 of increased diameter of the bearing inner part 1 and the channel carrier 11 due to the special shape of the carrier bodies 16, 17 and the channel carrier 11. The chambers 6, 7 are connected to one another by a channel 12 extending on the outer contour of the channel ring 15. The channel 12 can be recognized particularly well in the axonometric view in FIG. 4. Channel 12 extends helically or spirally on the outer contour of the channel ring 15, so that channel 12 connects between the chambers 6, 7 located opposite one another. The bearing inner part 1 as well as the channel carrier 11 are surrounded in some sections by an elastomer 9, 9' and are connected to same by vulcanization.

Figure 5:
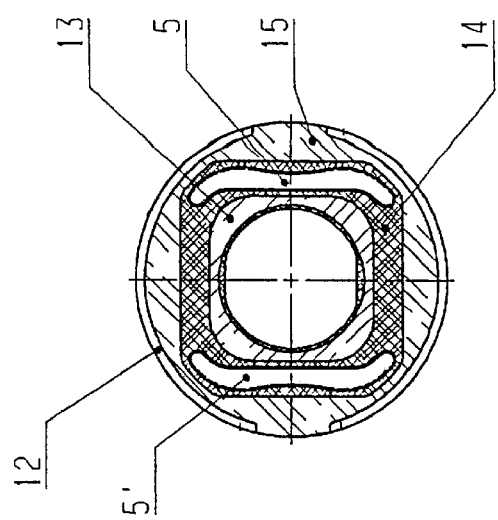
FIG. 5 is in an axonometric view showing the channel carrier according to FIGS. 3 and 4.
Figure 4:
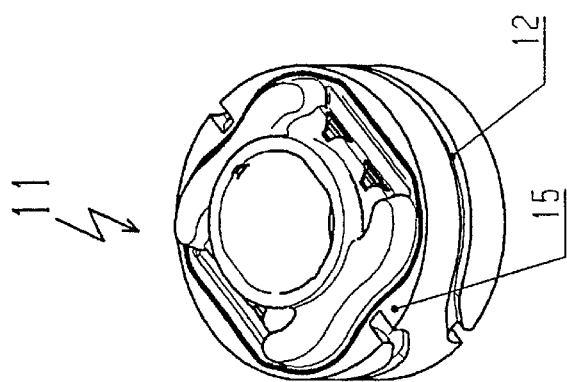
FIG. 4 is an axonometric view showing the channel carrier according to FIG. 3.
Figure 3:
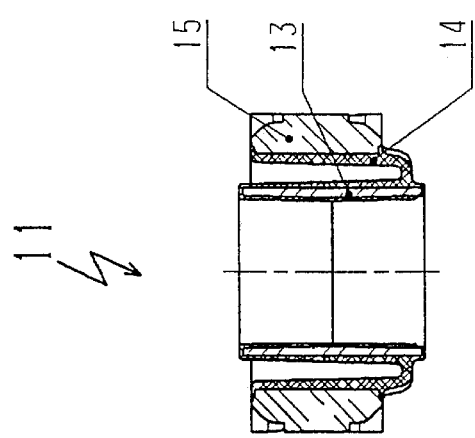
FIG. 3 is an axial sectional view showing the channel carrier of the bearing according to FIGS. 1 and 2.

The special design of the channel carrier 11 is once again illustrated by FIGS. 3 through 5. FIG. 3 shows the inner sleeve 13 of the channel carrier 11, which is connected by vulcanization to an elastomer 14 and to the annular channel ring 15. Damping agent channels 5, 5' are provided between the channel ring 15 and the inner sleeve 13. These chambers 5, 5' are in connection with at least one of the respective chambers 6 and 7 being formed between the carrier body 16 and the channel carrier 1 during the mounting on the bearing at the axial ends of the bearing. One possibility of leading the channel can be seen in FIG. 4. The channel 12 extending helically around the channel ring 15 connects the damping agent chamber 6, which is at the same time in connection with the chambers 5, 5' of the channel carrier 11, to the damping agent chamber 7 arranged in an axially opposite location. A length of the channel and thus the damping behavior of the bearing can be varied by varying the slope or the pitch of the helix of the channel. The chambers 5, 5' formed by the channel carrier 11 are also clearly recognizable in FIG. 5, which shows a radially cut-away view of the channel carrier 11. In the exemplary embodiment being shown, the inner sleeve 13 of the channel carrier 11 has an outer contour with an approximately square cross section. The characteristic of the bearing is determined by this outer contour. The special design of the bearing makes it possible to vary the characteristic without changing the inner geometry of the bearing inner part 1. This is a significant advantage of this modular embodiment of the rubber bearing. The properties of the bearing, such as the damping behavior and the characteristic, are determined mainly by the design of the channel carrier 11, especially the outer contour of its inner sleeve 13 and of the channel 12.

Figure 8:
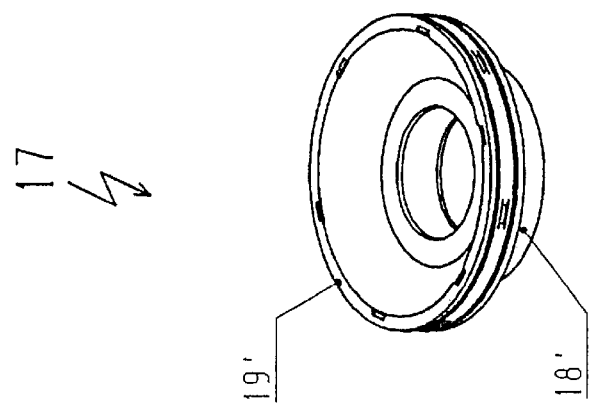
FIG. 8 in an axonometric view showing another carrier body, which forms the bearing inner part together with the carrier body according to FIG. 6.
Figure 7:
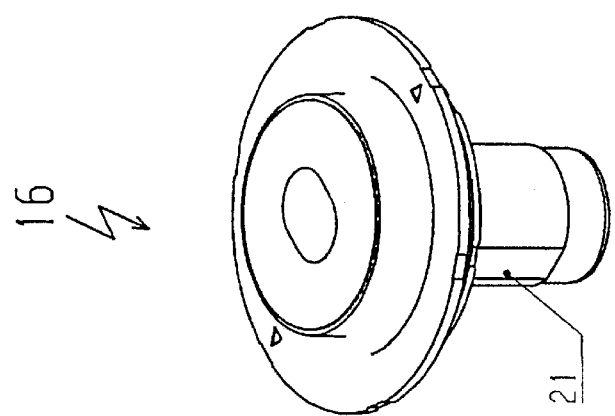
FIG. 7 is an axonometric view showing the carrier body according to FIG. 6.
Figure 6:
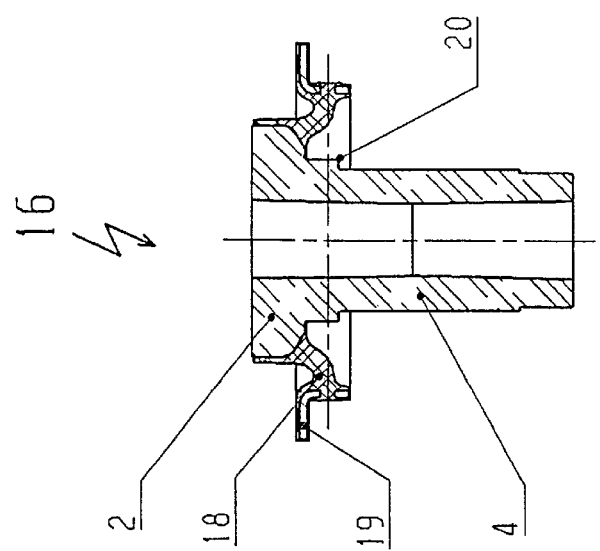
FIG. 6 is an axially cut-away view showing a carrier body of the bearing inner part.

The design of the carrier body 16 of the bearing inner part 1, which said carrier body is the upper carrier body according to FIG. 1, is once again shown in FIG. 6. According to the example shown, the carrier body 16 forms the entire middle area 4 of the bearing inner part 1 and the axial closure of one end of the bearing. The diameter of this axial closure is increased compared with the middle area 4. In the area of the axial closure, the carrier body 16 is surrounded by vulcanization with an elastomer 18 and an outer ring 19 forming a sealing lip. A shoulder 20 is provided on the area 4 with reduced diameter in the vicinity of the axial closure corresponding to the embodiment shown The channel carrier 11 of the bearing is fixed on this shoulder in the axial direction. The second carrier body 17, which forms the bearing inner part 1 together with the carrier body 16, is shown once again as a detail in FIG. 8. It is a ring, which can be pushed over the middle area 4 formed by the carrier body 16 and which is likewise surrounded with an elastomer 18' and an outer ring 19' by vulcanization.

To mount the bearing in the correct position, the carrier body 16 forming the middle are of the bearing inner part 1 is provided with a flattened area 21 on its circumferential surface.

While specific embodiments of the invention have been shown and described in detail to illustrate the application of the principles of the invention, it will be understood that the invention may be embodied otherwise without departing from such principles.

What is claimed is:

1. A rubber bearing with axial damping, the bearing comprising:

a multipart bearing inner part, said bearing inner part having rigid sections of increased diameter at each axial end of the bearing, said rigid sections being of increased diameter compared with a middle area of said bearing inner part;

a first elastomer surrounding said bearing inner part in some sections of said bearing inner part, said first elastomer being connected to said bearing inner part by vulcanization;

an essentially cylindrical bearing sleeve accommodating said bearing inner parts;

a channel carrier with chambers for accommodating a damping agent and at least one damping agent channel for the circulation of the damping agent between said chambers, said channel carrier comprising an inner sleeve, a second elastomer connected to the inner sleeve by vulcanization, and a channel ring surrounding said inner sleeve and surrounding said second elastomer, said channel ring being connected to said second elastomer by vulcanization, said channel carrier being arranged between said sections of increased diameter of said bearing inner part, a groove being formed into the outer contour of said channel ring and defining said at least one damping agent channel between said channel ring and said bearing sleeve, at least some of said chambers being formed in said channel carrier and some of said chambers being formed upon mounting of the channel carrier between said sections of increased diameter of the said bearing inner part in a vicinity of said axial bearing ends, said chambers in the vicinity of said axial bearing ends being connected to one another via said channel, two of said chambers being first and second middle chambers arranged on diametrically opposed sides of said inner part.

2. A rubber bearing in accordance with one of the claim 1, wherein said channel for the damping agent extends obliquely or helically on an outer contour of said channel carrier and connects to said chambers formed during the mounting of the bearing between said channel carrier and said sections of increased diameter of said bearing inner part, said chambers being located axially opposite one another, wherein a length of said channel and thus the damping behavior of the bearing can be varied by varying the slope or the pitch of the helix of said channel.

3. A rubber bearing in accordance with claim 2, wherein a connection is provided for circulation of damping agent between said chamber or chambers formed in the vicinity of one axial end of the bearing and said chambers in said channel carrier.

4. A rubber bearing in accordance with claim 1, wherein an outer contour of said inner sleeve of said channel carrier and said second elastomer surrounding said inner sleeve have a cross section deviating from a circular shape, and an inner contour of said inner sleeve has an essentially circular cross-sectional shape.

5. A rubber bearing in accordance with claim 1, further comprising another elastomer; and an outer ring, said bearing inner part is formed from two carrier bodies, a first of said carrier bodies forming an entire middle area of said bearing inner part and a section of one axial bearing end which joins said middle area and has an increased diameter compared with said middle area, and a second of said carrier bodies is a ring forming another axial bearing end of increased diameter, said second of said carrier bodies being pushed over said middle area of said first of said carrier bodies, where in both said first of said carrier bodies and said second of said carrier bodies are surrounded in an area of the axial bearing ends by said another elastomer, said another elastomer having a part vulcanized to said first of said carrier bodies and to said outer ring, and having a part vulcanized to said second of said carrier bodies and to said outer ring.

6. A rubber bearing in accordance with claim 5, wherein said carrier body on said part forming said middle area of said bearing inner part has a shoulder provided at in the vicinity of a section of increased diameter for axial fixation of a position of said channel carrier.

7. A rubber bearing in accordance with claim 5, wherein said part of said carrier body forming said middle area of said bearing inner part has a flattened area on a circumferential surface for mounting the bearing in the correct position.

8. A rubber bearing in accordance with claim 5, wherein said carrier bodies forming said bearing inner part are designed as thin-walled hollow section elements.

9. A bearing comprising:

a inner part with first and second ends and with a middle area, said first and second ends having a larger diameter than said middle area, said first and second ends and said middle area being rigid;

an inner sleeve around said middle area of said inner part;

a middle elastomer arranged around said inner sleeve and connected to said inner sleeve by vulcanization;

a channel ring arranged around said middle elastomer and connected to said middle elastomer by vulcanization;

a bearing shell arranged around said channel ring, said bearing shell and said channel ring defining a channel extending between said first and second ends of said inner part;

a first end elastomer connected to said first end of said inner part and connected to a first end of said bearing shell;

a second end elastomer connected to said second end of said inner part and connected to a second end of said bearing shell, said first, second and middle elastomers defining end chambers at said first and second ends of said inner part, said first, second and middle elastomers defining middle chambers at said middle area of said inner part, said channel connecting said end chambers, said middle chambers including first and second middle chambers arranged on diarmetrically opposite radial sides of said inner part.

10. A bearing in accordance with claim 9, wherein:

said elastomers are more flexible than said inner part.

11. A bearing in accordance with claim 9, wherein:

said inner part includes first and second carrier bodies, said first carrier body forms said middle area of said inner part and said first end which joins said middle area, said second carrier body is a ring forming said second end of increased diameter, said second carrier body being pushed over said middle area of said first carrier body, said first carrier body and said second carrier body are connected to said first and second elastomers by vulcanization respectively;

a first outer ring arranged around, and connected to, said first elastomer;

a second outer ring arranged around, and connected to, said second elastomer.

12. A bearing in accordance with claim 11, wherein:

said first and second outer rings are connected to said bearing shell.

13. A bearing in accordance with claim 9, wherein:

said first and second middle chambers are in communication with each other through one of said end chambers.

14. A bearing in accordance with claim 9, wherein:

said middle elastomer divides said first and second middle chambers.

15. A rubber bearing with axial damping, the bearing comprising:

a multipart bearing inner part, said bearing inner part having rigid sections of increased diameter at each axial end of the bearing, said rigid sections being of increased diameter compared with a middle area of said bearing inner part;

a first elastomer surrounding said bearing inner part in some sections of said bearing inner part, said first elastomer being connected to said bearing inner part by vulcanization;

an essentially cylindrical bearing sleeve accommodating said bearing inner parts;

a channel carrier with chambers for accommodating a damping agent and at least one damping agent channel for the circulation of the damping agent between said chambers, said channel carrier comprising an inner sleeve, a second elastomer connected to the inner sleeve by vulcanization, and a channel ring surrounding said inner sleeve and surrounding said second elastomer, said channel ring being connected to said second elastomer by vulcanization, said channel carrier being arranged between said sections of increased diameter of said bearing inner part, a groove being formed into the outer contour of said channel ring and defining a said at least one damping agent channel between said channel ring and said bearing sleeve, at least some of said chambers being formed in said channel carrier and some of said chambers being formed upon mounting of the channel carrier between said sections of increased diameter of the said bearing inner part in a vicinity of said axial bearing ends, said chambers in the vicinity of said axial bearing ends being connected to one another via said channel, an outer contour of said inner sleeve of said channel carrier and said second elastomer surrounding said inner sleeve having a cross section deviating from a circular shape, and an inner contour of said inner sleeve has an essentially circular cross-sectional shape.

16. A rubber bearing in accordance with claim 15, wherein said outer contour of said inner sleeve of said channel carrier and said second elastomer surrounding said inner sleeve have an approximately square cross section.

17. A rubber bearing in accordance with claim 15, wherein said outer contour of said inner sleeve of said channel carrier and said second elastomer surrounding said inner sleeve have an approximately rectangular cross section.

* * * * *